United States Patent
Golub et al.

(10) Patent No.: US 9,216,904 B2
(45) Date of Patent: Dec. 22, 2015

(54) RECOVERY OF SULFUR FROM SULFUR-CONTAINING WASTE

(71) Applicant: Environmental Services Company Ltd., Beer-Sheva (IL)

(72) Inventors: Gilad Golub, Lehavim (IL); Julio Subovich, Beer Sheva (IL); Ofer Garden, Haifa (IL); Israel Garden, Haifa (IL)

(73) Assignees: Environmental Services Company Ltd., Beer-Sheva (IL); Israel Garden, Haifa (IL)

( * ) Notice: Subject to any disclaimer, the term of this patent is extended or adjusted under 35 U.S.C. 154(b) by 0 days.

(21) Appl. No.: 13/730,948

(22) Filed: Dec. 29, 2012

(65) Prior Publication Data

US 2013/0330266 A1    Dec. 12, 2013

(30) Foreign Application Priority Data

Jan. 9, 2012  (IL) .......................................... 217437

(51) Int. Cl.
| | | |
|---|---|---|
| *C01B 17/027* | (2006.01) | |
| *C01B 17/02* | (2006.01) | |
| *B09B 5/00* | (2006.01) | |

(52) U.S. Cl.
CPC .............. *C01B 17/0226* (2013.01); *B09B 5/00* (2013.01); *C01B 17/027* (2013.01)

(58) Field of Classification Search
CPC .................................................. C01B 17/027
USPC ........... 423/578.4; 422/187; 203/40; 202/152
See application file for complete search history.

(56) References Cited

U.S. PATENT DOCUMENTS

| | | | |
|---|---|---|---|
| 2,113,230 A | | 4/1938 | Ceccon |
| 2,508,292 A | | 5/1950 | Porter et al. |
| 4,192,851 A | * | 3/1980 | Hirsch et al. ..................... 423/28 |
| 6,696,037 B1 | * | 2/2004 | Watanabe et al. .......... 423/578.4 |
| 2002/0192132 A1 | * | 12/2002 | Carlson et al. ................. 422/198 |
| 2009/0162270 A1 | * | 6/2009 | Carrasco ....................... 423/571 |
| 2009/0242379 A1 | | 10/2009 | Tokumasu et al. |

FOREIGN PATENT DOCUMENTS

| | | |
|---|---|---|
| DE | 36 41 101 A1 | 6/1988 |
| FR | 901 130 A | 7/1945 |

OTHER PUBLICATIONS

Search Report for European Application No. 12199652.4; dated Jun. 5, 2013.

* cited by examiner

*Primary Examiner* — Timothy Vanoy
(74) *Attorney, Agent, or Firm* — Alston & Bird LLP

(57) ABSTRACT

A process and apparatus are provided for treating sulfur-containing waste, resulting in recovered pure sulfur and a sulfur-free ash for landfilling. In regards to a process, a sulfur-containing waste is heated in a receptacle at between 120 and 160° C. to obtain a mixture including raw molten sulfur. The process optionally separates solids, by rough screening, from the mixture and transfers the mixture, following optional screening, to a separating reactor heated at between 450 and 500° C. to create sulfur vapor and sulfur-free solid phase. The process transfers the sulfur vapor to a condenser cooled to between 120 and 140° C. to obtain molten sulfur and transfers the solid phase to a cooling conveyor, with the solid phase being collected as ash for landfilling. The process further removes gases from the condenser with an off-gas cleaner and collects from the condenser essentially pure sulfur.

14 Claims, 1 Drawing Sheet

1) Sulfur Feed
2) Separation Reactor
3) Vapor Block
4) Cooling Conveyor
5) Sulfur Condenser
6) Off Gas Scrubber

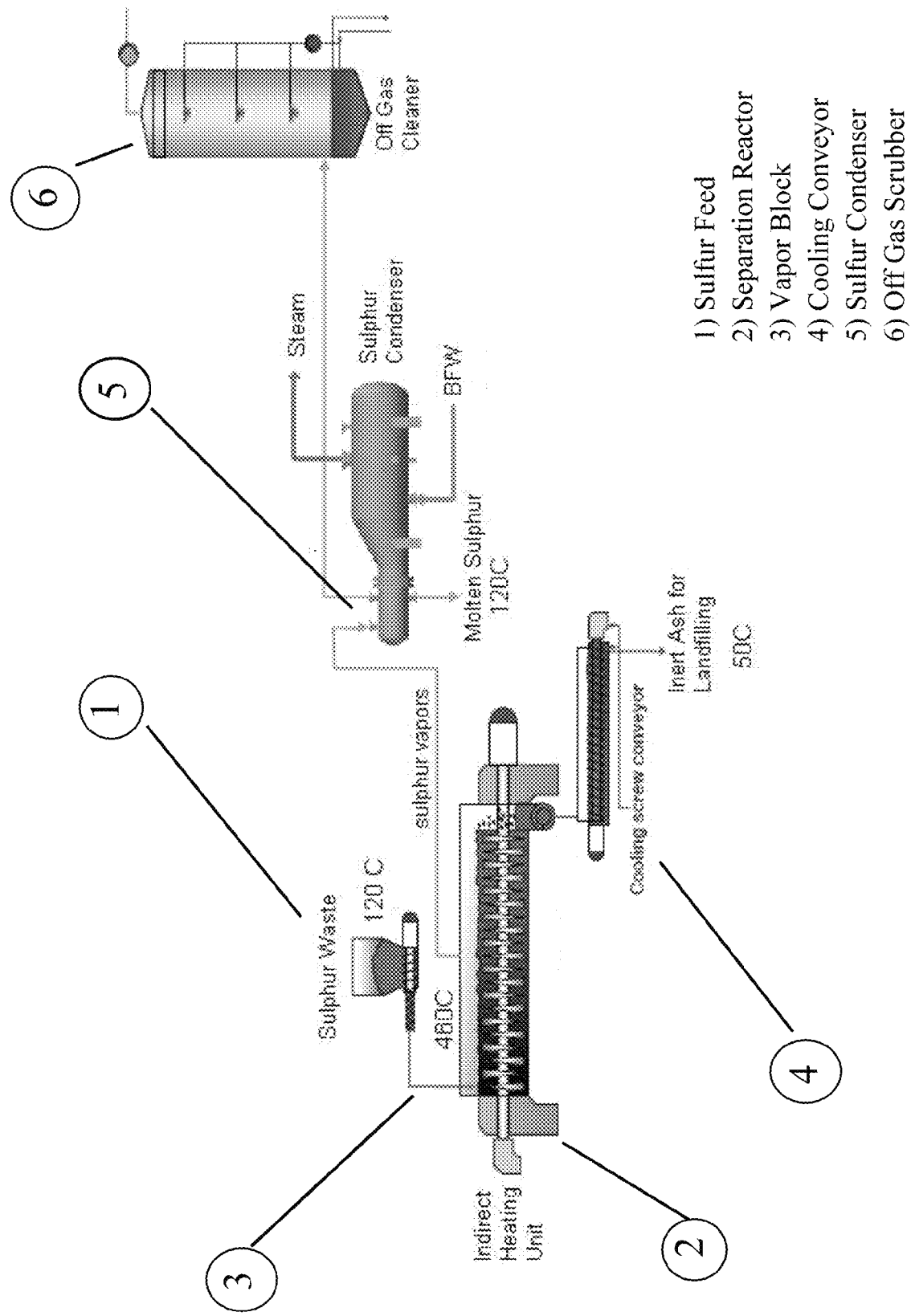

US 9,216,904 B2

RECOVERY OF SULFUR FROM SULFUR-CONTAINING WASTE

FIELD OF THE INVENTION

The present invention relates to processing sulfur-containing waste, and particularly to environmentally friendly process resulting in recovered pure sulfur and solid spent precoat for landfilling.

BACKGROUND OF THE INVENTION

Still stricter environmental and safety regulations do not allow free burial of the waste. Controlled land filling may be the preferred option, depending on the composition of the buried material. It is desirable to convert the waste to a less harmful product, and possibly to reduce its volume, while preferably recovering some of materials. Hundreds of thousands tons of sulfur-containing waste accumulates from chemical and other industries around the world every year. A significant source of sulfur waste are filter cakes from the massive production of sulfuric acid, resulting from molten sulfur filtered through media based on diatomaceous earth and lime. Controlled burial is necessary in order to prevent the formation and spreading of sulfur compounds, which is cost demanding. When exposed to oxygen, sulfur may undergo slow oxidation creating acidic problematic environment, while anaerobic bacterial reactions may occur in the deeper layers of the landfill which will produce smelly and toxic sulfides. It is therefore an object of this invention to provide a method of converting sulfur-containing waste to spent precoat material which could be economically buried by landfilling. This invention also aims at recovering sulfur from said waste. U.S. Pat. No. 2,508,292 relates to sulfur vaporization and purification, comprising a complex system of hot ceramic particles circulating through the reactor. US 2009/0242379 relates to the recovery and purification of sulfur, comprising hot steam directly contacting sulfur deposits and melting them. The existing systems are too complicated, and do not enable to convert sulfur-rich waste to environmentally material for landfilling or to provide a pure recovered sulfur product in a cost-effective industrial manner. It is another object of this invention to separate sulfur from spent precoat materials in solid waste, without introducing further substance, while recovering sulfur in a practical industrial process, in a cost-effective manner.

It is another object of this invention to provide an environmentally friendly industrial process for recovering sulfur from sulfur-containing waste in high yields, while converting the waste to low volume, sulfur-free material which may be landfilled, while employing an economical process and complying with the valid land filling regulations.

Other objects and advantages of present invention will appear as description proceeds.

SUMMARY OF THE INVENTION

The present invention provides a process for disposing of sulfur-containing waste, comprising the steps of i) heating a sulfur-containing waste in a receptacle at a temperature of between 120 and 160°, thereby obtaining a mixture comprising raw molten sulfur; ii) optionally separating solids from said mixture obtained in step i); iii) transferring said mixture obtained in step i) optionally screened as in said step ii) from said receptacle to a separating continuous reactor heated at a temperature of between 450 and 500° C., whereby creating sulfur vapor and essentially sulfur-free residual solid phase; iv) transferring said sulfur vapor formed in step iii) from said reactor to a condenser cooled to a temperature of between 120 and 140° C., whereby obtaining molten sulfur; v) transferring said residual solid phase formed in step iii) from said reactor to a cooling conveyor, and collecting said phase as a sulfur free ash for land filling; and vi) removing gases from said condenser by means of an off-gas cleaner, and collecting from said condenser essentially pure sulfur. In a preferred embodiment of the invention, the process further comprises a step of recovering latent heat from said sulfur condenser by transferring it to a suitable medium, for example water or water vapor. Preferable, also the heat from said cooling conveyor is recovered. Said separating step ii) may comprise a screening technique, or it may comprise separation of phases by gravity. The process according to the invention comprises converting harmful waste to essentially pure sulfur product and to essentially sulfur free solid waste for land filling. Said sulfur product preferably contains at least 99% wt % sulfur, for example at least 99.1% or at least 99.2% or at least 99.3% or at least 99.3 or at least 99.4% or at least 99.5% or at least 99.6%, such as at least 99.7% or at least 99.8% or at least 99.85%, for example at least 99.9%. Said solid for land filling typically contains 1% sulfur or less, for example maximally 0.9% or maximally 0.8% or maximally 0.7% or maximally 0.6% or maximally 0.5% or maximally 0.4%, such as 0.3% or less or 0.2% or less or 0.1% sulfur or less.

The invention is directed to a process as described above, comprising the steps of i) providing a sulfur-containing waste and, without dividing it to smaller parts, feeding it to said receptacle heated at a temperature of between 125 and 135° C., said waste partially melting and forming a suspension in said receptacle; ii) screening said suspension from step i), thereby screening raw molten sulfur; iii) transferring said raw screened sulfur to a separating reactor heated at a temperature of from 460 and 480°, obtaining sulfur vapor and spent precoat residues; iv) transferring said sulfur vapor formed in step iii) to a condenser cooled to a temperature of between 120 and 130° C., whereby obtaining molten sulfur and condensation heat; v) transferring said spent precoat solid residues formed in step iii) from said reactor to a cooling conveyor, and collecting said essentially sulfur-free phase as a cooled solid for land filling, while transferring its heat to a cooling medium; and vi) removing gases from said condenser by means of an off-gas cleaner connected to said condenser, and collecting from said condenser essentially pure sulfur.

The invention provides an apparatus for converting sulfur-containing waste to essentially pure sulfur product and to solid waste for landfilling, comprising i) receptacle for sulfur-containing waste, provided with heating to keep the receptacle at a temperature of from 120 to 160° C.; ii) separating reactor connected in a gas-proof manner with said receptacle, for heating material transferred from said receptacle, provided with indirect heating to keep the reactor at a temperature of 450 to 500° C.; iii) cooling screw conveyor connected in a gas-proof manner with said reactor, for cooling of solid phase transferred from said reactor, wherein the temperature of said solid phase decreases to less than 60° C.; iv) condenser connected to said reactor in a gas-proof manner with said reactor, for cooling sulfur vapor transferred from said reactor, provided with cooling to keep the molten sulfur in the condenser at a temperature of from 118 to 130°; v) off-gas cleaner connected in a gas-proof manner with said condenser, for removing gases from molten sulfur in said condenser; and vi) means for controlling the transfer of (a) material from said receptacle to said reactor, (b) spent precoat phase from said reactor to said conveyor, (c) sulfur vapor from said reactor to said condenser, (d) gases from said condenser to said off-gas cleaner, and (e) molten sulfur from said condenser to a product container. The apparatus of the invention preferably comprises inner surfaces made of or coated with special stainless steel.

The invention is directed to a process as described above, which comprises sulfur recovery from industrial waste, while nearly completely removing useful sulfur from waste before landfilling, the process working in a batch-wise manner or in a continuous manner. The invention is directed to an environmentally friendly industrial process comprising treating a sulfur-rich waste from the production of sulfuric acid, which process provides an essentially pure sulfur product and a sulfur-free spent precoat ash for landfilling.

BRIEF DESCRIPTION OF THE DRAWINGS

The above and other characteristics and advantages of the invention will be more readily apparent through the following examples, and with reference to the appended drawings, wherein:

FIG. 1. is a schematic view of the process according to one embodiment of the invention.

DETAILED DESCRIPTION OF THE INVENTION

It has now been found that sulfur-containing waste can be safely and economically handled and landfilled after heat treatment in an apparatus according to the invention, while further obtaining pure sulfur for reusing in chemical industry. Even if processing a waste of a high-sulfur content such as 80%, the treated waste typically contains less than 1% wt sulfur, whereas the recovered sulfur side product has typically at least 99.0% sulfur. The apparatus of the invention for recovery of sulfur from sulfur-containing waste comprises (for example as schematically shown in FIG. 1) a receptacle of sulfur waste (1), separating reactor provided with indirect heating (2) and a gas-proof inlet from said receptacle (3), cooling screw conveyor (4) connected to said reactor in a gas-proof manner, sulfur condenser connected to said reactor (5), and a gas cleaner (6) connected to said condenser. Said receptacle may be heated at 110-140° C., for example 125° C., said reactor at a temperature of 460° C., said condenser at 120° C. Said conveyor provides treated spent precoat ash—for landfilling. Heat is preferably recovered from said sulfur condenser. Heat may be also recovered from said conveyer, which may provide ash having, for example, 50° C.

In one embodiment, the receptacle may receive blocks or fragments or clods of waste, without need of further fragmenting the waste. Sulfur melts and passes through a screen to prevent stones and other foreign materials to enter the main reactor, and raw sulfur with waste is then transferred from receptacle into a reactor through a gas-proof feeder, which prevents escaping sulfur vapor out of the reactor, and reduces the penetration of air into the reactor. The reactor is heated to a temperature higher than boiling point of sulfur, preferably between 450 and 500° C. In a preferred embodiment of the invention, sulfur is recovered from a waste comprising between 50 and 80% sulfur. Percent means weight percent throughout the description. Sulfur evaporates in the reactor and is collected through a conduit into a sulfur condenser. The specific heat of sulfur condensation, which occurs in said condenser, is preferably utilized for producing water steam. The condensed sulfur is collected as a liquid, preferably at a temperature between 118 and 126° C. The residue after sulfur removal is transported from the reactor through an outlet preventing sulfur vapor escape. A spent precoat solid residue is cooled and collected for landfilling.

Recovered sulfur is a pure, commercially usable product, or a product advantageously re-usable in chemical industry, even in the same industry that produced the waste. The solid residue has substantially reduced volume, which makes its disposal much cheaper, if compared with disposing off the original sulfur-containing waste.

In one embodiment, the molten sulfur from the receptacle will be introduced to the main reactor through a bidirectional lock, preventing sulfur vapor from escaping the reactor, and also preventing the air to enter the reactor and react with sulfur vapor. The reactor, indirectly heated, will be continuously mixed in order to improve heat transfer in the reactor and enhance separation of sulfur vapor from spent precoat ash; evaporation is carried out in an indirect way: from shell to spent precoat media and from spent precoat media to sulfur waste. The equipment is, in one preferred embodiment, made of stainless steel. The waste is fed supplied to the receptacle without grinding, for example in the form of filtration cakes.

Thus, the invention aims at processing industrial solid waste containing sulfur, while obtaining a solid residue which can be safely disposed of by landfilling in accordance with the new strict environmental regulations. The solid waste is preferably a filtration cake from manufacturing sulfuric acid, possibly a half meter in diameter, containing diatomaceous earth and between 50 and 90% sulfur, more typically between 60 and 80% sulfur. The invention relates to an apparatus and to a method comprising steps of a) feeding the waste without grinding to a receptacle and preheating the solid waste to 120-125° C., b) screening the obtained suspension, c) heating the mixture at 460-500° C. in a separating reactor, d) collecting the released gas from the reactor in a condenser, thereby obtaining molten sulfur of a purity of 99.0% or more, possibly about 99.9%, while utilizing the latent heat for producing steam, and e) removing from the reactor a solid residue by a cooling screw conveyor in the form of an ash for land filling. The apparatus comprises receptacle, separation reactor with indirect heating unit, sulfur condenser, cooling screw conveyor, bidirectional locks between each two neighboring units, and an off gas cleaner, whereas the surfaces in contact with hot sulfur are made of special alloy.

No known technique can be efficiently employed for processing the cakes from the sulfuric acid production and for safely disposing them in a landfill, while providing a pure product from evaporated and condensed sulfur, in an environmentally friendly process, utilizing also the latent heat.

In one aspect, a method for processing sulfur-containing waste, comprising the step of solid-solid separation is provided. In a preferred embodiment, a valuable side product of a pure sulfur product is provided—containing more than 99% sulfur, more preferably more than 99.2% sulfur, and still more preferably more than 99.4% sulfur. The recovered sulfur may have a purity of at least 99.5%, or at least 99.6%, or at least 99.7%, or at least 99.8%, for example 99.85%.

The invention aims at sulfur recovery from industrial waste, while nearly completely removing potentially harmful sulfur from waste before landfilling, by employing an industrial process of any scale, working in a batch-wise manner or in a continuous manner. The steps of feeding the waste to the receptacle, transferring molten sulfur from the receptacle to separating reactor, and removing the condensed sulfur product from the condenser may be performed in a continual manner, or they, in any combination, can be carried out in discrete portions in a batch-wise manner, depending on the equipment arrangement.

In one aspect, the invention provides a process for treating a sulfur-rich waste, which process provides a pure sulfur product and a sulfur-free spent precoat ash for landfilling. In another aspect, provided is an environmentally friendly industrial process for recycling sulfur, comprising the steps of heating a sulfur-containing waste in a receptacle at a temperature of between 125 and 150°, transferring molten sulfur to a reactor heated at a temperature of between 450 and 500°, transferring sulfur vapor to a condenser, and collecting solid waste for landfilling. In a still other aspect of the invention, provided is a method for disposing off sulfur-containing filter cakes from the production of sulfuric acid, comprising the steps of heating them in a receptacle at a temperature of between 125 and 150°, transferring molten sulfur to a reactor heated at a temperature of between 450 and 500°, transferring sulfur vapor to a condenser, and collecting harmless solid waste for landfilling.

In one embodiment of the invention, the sulfur-rich waste comprises filter cakes from leaf filter from sulfuric acid plants, where molten sulfur is filtered through media of diatomaceous earth and lime. Neutralizing to potentially harmful effects from such waste is quite expensive, and the present process enables disposal of such waste in a cost-effective and environmentally friendly manner.

The invention will be further described and illustrated in the following examples.

EXAMPLES

Four filtration cakes (waste) about 5 kg each, were placed in a receptacle heated to 130° C. and placed above a reactor into which the cakes slid, while keeping the passage for air or sulfur vapor closed both ways. The horizontal inclined reactor had a volume of about 100 liters and was indirectly heated to 460° C. The heated waste was continuously stirred by central peddled shaft in the reactor, sulfur was vaporizing and leaving an spent precoat ash moving along the reactor towards the bottom exit and lock. Sulfur vapors entered the condenser, connected to the reactor, where they turned to liquid sulfur at 120° C. The condenser was producing low pressure steam of about 2 bar while cooling and condensing the sulfur. Liquid sulfur was further cooled to produced solid sulfur which was tested and proved to contain more than 99.2% sulfur. Spent precoat ashes collected from the reactor bottom and lock were cooled to 50° C. and tested for residual sulfur, and found to contain 0.2% sulfur.

While this invention has been described in terms of some specific examples, many modifications and variations are possible. It is therefore understood that within the scope of the appended claims, the invention may be realized otherwise than as specifically described.

The invention claimed is:

1. A process for disposing of sulfur-containing waste, comprising the steps of
   i) heating a sulfur-containing waste in a receptacle at a temperature of between 120 and 160° C., thereby obtaining a mixture comprising raw molten sulfur;
   ii) optionally separating solids, by rough screening, from said mixture obtained in step i);
   iii) transferring said mixture obtained in step i) optionally screened as in said step ii) from said receptacle to a separating reactor heated at a temperature of between 450 and 500° C., whereby creating sulfur vapor and sulfur-free solid phase;
   iv) transferring said sulfur vapor formed in step iii) from said reactor to a condenser cooled to a temperature of between 120 and 140° C., whereby obtaining molten sulfur;
   v) transferring said solid phase formed in step iii) from said reactor to a cooling conveyor, and collecting said phase as an ash for landfilling; and
   vi) removing gases from said condenser by means of an off-gas cleaner, and collecting from said condenser essentially pure sulfur.

2. A process according to claim 1, further comprising a step of recovering heat from said sulfur condenser by transferring said heat to water vapor.

3. A process according to claim 1, further comprising a step of recovering heat from said cooling conveyor.

4. A process according to claim 1, wherein said step ii) of separating comprises screening.

5. A process according to claim 1, comprising converting harmful waste to essentially pure sulfur product and to an essentially sulfur-free solid waste for landfilling.

6. A process according to claim 5, wherein said sulfur product contains at least 99.0 wt % sulfur.

7. A process according to claim 5, wherein said solid for landfilling contains less than 1 wt % sulfur.

8. A process according to claim 5, wherein said sulfur product contains at least 99.5 wt % sulfur.

9. A process according to claim 5, wherein said solid for landfilling contains less than 0.5 wt % sulfur.

10. A process according to claim 1, comprising the steps of
    i) providing a sulfur-containing waste and, without necessarily dividing it to smaller parts, feeding it to said receptacle heated at a temperature of between 125 and 135° C., said waste partially melting and forming a suspension in said receptacle;
    ii) screening said suspension from step i), thereby separating raw molten sulfur and a solid phase;
    iii) transferring said raw sulfur to a separating reactor heated at a temperature of from 460 and 480° C., obtaining sulfur vapor and spent precoat solid phase residue;
    iv) transferring said sulfur vapor formed in step iii) to a condenser cooled to a temperature of between 120 and 130° C., whereby obtaining molten sulfur and condensation heat;
    v) transferring said spent precoat solid phase residue formed in step iii) from said reactor to a cooling conveyor, and collecting said essentially sulfur-free phase as an essentially sulfur free cooled solid for landfilling, while transferring its heat to a cooling medium; and
    vi) removing gases from said condenser by means of an off-gas cleaner connected to said condenser, and collecting from said condenser essentially pure sulfur.

11. An apparatus for converting sulfur-containing waste to essentially pure sulfur product and to solid waste for landfilling, comprising
    i) receptacle for sulfur-containing waste, provided with heating to keep the receptacle at a temperature of from 120 to 160° C.;
    ii) separating reactor connected in a gas-proof manner with said receptacle, for heating material transferred from said receptacle, provided with indirect heating to keep the reactor at a temperature of 450 to 500° C.;
    iii) cooling screw conveyor connected in a gas-proof manner with said reactor, for cooling spent precoat solid phase transferred from said reactor, wherein the temperature of said condensed phase decreases to less than 60° C.;
    iv) condenser connected to said reactor in a gas-proof manner with said reactor, for cooling sulfur vapor transferred from said reactor, provided with cooling to keep the condensed sulfur in the condenser at a temperature of from 118 to 130° C.;

v) off-gas cleaner connected in a gas-proof manner with said condenser, for removing gases from molten sulfur in said condenser; and vi) means for controlling the transfer of (a) material from said receptacle to said reactor, (b) spent precoat solid phase from said reactor to said conveyor, (c) sulfur vapor from said reactor to said condenser, (d) gases from said condenser to said off-gas cleaner, and (e) molten sulfur from said condenser to a product container.

12. The apparatus of claim 11, provided with inner surfaces made of special alloy.

13. A process according to claim 1, comprising sulfur recovery from industrial waste, while nearly completely removing environmentally harmful sulfur from waste before landfilling, the process working in a batch-wise manner or in a continuous manner.

14. An environmentally friendly industrial process according to claim 1, comprising treating a sulfur-rich waste from the production of sulfuric acid, providing an essentially pure sulfur product and a sulfur-free spent precoat ash for landfilling.

\* \* \* \* \*

UNITED STATES PATENT AND TRADEMARK OFFICE
CERTIFICATE OF CORRECTION

| | | |
|---|---|---|
| PATENT NO. | : 9,216,904 B2 | Page 1 of 1 |
| APPLICATION NO. | : 13/730948 | |
| DATED | : December 22, 2015 | |
| INVENTOR(S) | : Golub et al. | |

It is certified that error appears in the above-identified patent and that said Letters Patent is hereby corrected as shown below:

<u>Title page,</u>
Item (71) Applicant: "Environmental Services Company Ltd., Beer-Sheva (IL)" should read
--Environmental Services Company Ltd., Beer-Sheva (IL); Israel Garden, Haifa (IL)--.

Signed and Sealed this
Sixteenth Day of August, 2016

Michelle K. Lee
*Director of the United States Patent and Trademark Office*